United States Patent [19]
> Uroda

[11] Patent Number: 4,729,919

[45] Date of Patent: Mar. 8, 1988

[54] PROTECTIVE BARRIER COATING FOR STYROFOAM USING AN UNSATURATED THERMOSETTABLE RESIN COMPOSITION

[75] Inventor: James C. Uroda, Lake Jackson, Tex.

[73] Assignee: The Dow Chemical Company, Midland, Mich.

[21] Appl. No.: 81,417

[22] Filed: Aug. 4, 1987

[51] Int. Cl.$^4$ ............................ B32B 3/26; B32B 5/16; B32B 7/04
[52] U.S. Cl. .................................... 428/215; 427/203; 427/412.1; 428/319.3; 428/319.7; 428/519; 428/520
[58] Field of Search ............................ 427/203, 412.1; 428/213, 214, 215, 304.4, 319.3, 319.7, 519, 520

[56] References Cited

U.S. PATENT DOCUMENTS

| | | | |
|---|---|---|---|
| 3,256,133 | 6/1966 | Wright et al. | 428/319.3 |
| 3,583,884 | 6/1971 | Baum | 428/319.3 |
| 4,451,529 | 5/1984 | Kerr, III et al. | 428/319.3 |
| 4,555,292 | 11/1985 | Thompson | 427/203 |

FOREIGN PATENT DOCUMENTS 2034433  12/1970  France .............................. 428/319.7

*Primary Examiner*—William J. Van Balen

[57] ABSTRACT

A coating for polystyrene foam products is set forth. The coating has the preferred form of a first latex layer of copolymer of butadiene with either styrene or vinylidene chloride or both mixed with a fine aggregate such as silica flour or fly ash and a top layer made of one or more strata of a thermosetting resin. This resin is a thermosetting mixture of ethylenically unsaturated monomers and/or one or more of:

1. unsaturated polyester or polyesteramide resins,
2. norbornyl modified unsaturated polyester or polyesteramide resins,
3. hydrocarbon modified unsaturated polyester or polyesteramide resins,
4. vinyl ester resins, or
5. mixtures of the foregoing resins.

The resin is mixed with an aggregate of particle size ranging from about 10 microns to larger as required and having a color pigment therein as required. The latex and resin with aggregate is applied over the polystyrene article to form a and protected composite structure.

10 Claims, No Drawings

PROTECTIVE BARRIER COATING FOR STYROFOAM USING AN UNSATURATED THERMOSETTABLE RESIN COMPOSITION

BACKGROUND OF THE DISCLOSURE

This disclosure is directed to a protective coating or barrier to be placed on styrofoam products in particular and others as will be described. Styrofoam is a registered trademark of Dow Chemical Company for an expanded cellular polystyrene. The present material is particularly adapted to be placed on styrofoam articles of any size or shape. Thus, the present disclosure is directed to polystyrene in particular and generally includes other foamed vinyl aromatic polymer surfaces which would include polystyrene polymer systems. This would also include copolymer systems.

A typical product made of styrofoam normally provides a relatively high strength, impact resistance, possesses excellent electrical and thermal insulation characteristics. It is however suspect to attack by certain hydrocarbon solvents and ultraviolet radiation from the sun. Enhanced abrasion resistance is another important physical factor. Attempts to place a coating on styrofoam are exemplified by a modified mortar available for styrofoam coating. The process is generally labor intensive and requires substantial curing times. In contrast with that, the present procedure yields a coated styrofoam article where the coating is applied with less labor and with a shorter curing interval and yet gains substantial physical characteristics after application. For instance, the applied coating yields a surface capable of withstanding greater physical abuse and is also resistant to weathering, namely, has greater ability to resist chemical changes resulting from ultraviolet light. The coating is thus a composite of material which utilizes a supportive latex layer on the styrofoam article surface under a coating incorporating an abrasion resistant aggregate. The coating is preferably an unsaturated thermosetting resin having a form to be described which binds the aggregate thereby yielding a surface with improved physical and chemical characteristics. Improvements are obtained and physical characteristics including abrasion resistance, the ability to withstand weathering more readily, and the ability to accept color to provide a cosmetically attractive finished articles. Moreover, the chemical characteristics are improved in that the coated product is made substantially resistant to a number of hydrocarbon solvents which would otherwise attack the underlying polystyrene. The present coating thus finds its best application in foamed vinyl aromatic monomers and especially in polystyrene formed in smooth skinned flat decorative panels, refrigerators, ice chests, ice buckets, water coolers, boats and the like.

Multi-layer composite materials having some type of sandwich construction are known. One example is U.S. Pat. No. 4,386,163 for a roofing material. It discloses a rubbery membrane over a plastic foam. It functions something like an isolating blanket and is typically manufactured in situ. Another exemplary reference is U.S. Pat. No. 4,357,384 which discloses a rigid polyurethane foam having a cement layer adhered thereto and a film of acrylic. Another reference is U.S. Pat. No. 3,389,518 which is directed to a resistant wall covering. This discloses a cellular polystyrene layer with some type of binder and intermediate layer. Another reference is U.S. Pat. No. 3,677,874 which is directed to a board made of various laminates of plastic resins e.g., polystyrene, the resins having different densities. U.S. Pat. No. 4,067,164 is directed to a facing material adhered to a smooth skin foam such as polystyrene. While the various disclosures just mentioned are representative of specialty approaches of the prior art, it is believed that the present product and the method of manufacture provide a finished product which is uniquely able to protect a typical foamed polystyrene (styrofoam is one example) product, yielding added or enhanced mechanical characteristics and also defining a structure which is made more resistant to weathering, hydrocarbon solvents and which otherwise has improved characteristics.

With the foregoing in mind, the process of the disclosure is one for applying a protective coating over vinyl aromatic monomers as foamed materials in general, and foamed polystyrene in particular. It incorporates a first layer of a copolymer system of butadiene with either styrene or vinylidene chloride. The copolymer latex is mixed with an amount of silica protecting from the penetrating nature of the monomers (acting as solvents) present in an unsaturated polyester resin. The coating is applied to a thickness ranging as a high as about 100 mils, the preferred range being about 3–20 mils. Once this surface is dry to the touch, the polyester resin and aggregate top coat can be applied to the surface for the finished product. The aggregate can either be mixed with the resin and applied as a mixture, or, the resin can be applied and then the aggregate applied by the chicken feed method. The size of the aggregate is typically as necessary to make the desired coating thickness. For a smooth coating, a fine mesh aggregate is used, and, if the appearance desired is more course, a suitable larger aggregate is used. The aggregate can be as large as ¼", but, usually a smaller size such as 3/32" to ⅛" will make the finished panel more attractive. The thermosetting resin can be:

1. unsaturated polyester or polyesteramide resins,
2. norbornyl modified unsaturated polyester or polyesteramide resins,
3. hydrocarbon modified unsaturated polyester or polyesteramide resins,
4. vinyl ester resins, or
5. mixtures of the foregoing resins.

These unsaturated resins are blended with about 1 to about 99 percent by weight and preferably 30 to 80 percent by weight, of one or more ethylenically unsaturated monomers to make up the thermosettable resin compositions.

DETAILED DESCRIPTION OF THE DISCLOSED EMBODIMENTS

The present procedure is intended to modify a surface on a polystyrene (styrofoam) surface. More generally, it can be applied to any vinyl aromatic monomer having a foamed plastic construction. It can be a typical smooth skinned flat sheet or other decorative panel. The precise nature of the product is not critical to the present disclosure and therefore can be most any product within the broad definition set forth above. Consider as an example a foamed styrofoam sheet material, the material having a density in the range of about 1 pound per cubic feet to about 10 pounds per cubic feet. The surface is in the form of a smooth skin so that it might be defined as a water tight member, that is, one that does not readily pass water or similar liquids. It is constructed with a closed cell foam and any surface area or extent required. Moreover, the thickness of the member can vary to any reasonable depth required. Over this surface, a multilayer coating is then applied. The first or initial layer applied on the surface is a mixture of a butadiene-copolymer latex system with a fine silica flour or fly ash added. This system is applied on the surface of the Styrofoam in a uniform thickness sufficient to cover the surface, but typically in the range of about 3-20 mils. The latex is a butadiene copolymer with either styrene or vinylidene chloride. Silica flour or fly ash size is in the range of 350 microns or less.

This latex-silica flour mix or latex-fly ash mix can be stirred to desired workability of a smooth flowable paste by using one part of the latex to 2, 3, or 4 parts by weight of the aggregate. This paste can then be applied to the Sytrofoam surface. After this latex layer has been applied and has substantially dried, the next step is to apply a coating of the thermosetting resin (described below) to the surface as a thin film coating. At this point, aggregate is dropped onto the surface in excess, and the excess is dusted or shaken away after curing. The aggregate that is applied can be chosen from silica flour, fly ash, sand, crushed stone or rock, metal fines, glass, or other synthetic fibers, composite fibers, hydrated alumina, ceramic beads, or mixtures to define an aggregate.

The physical characteristics of the aggregate are generally dictated by the physical properties required for the completed product. One example of this is a large crushed stone aggregate as a decorative tough surface. Another example is a fine mesh silica flour or fly ash to form a dense, textured surface that is closely knit together. Special visual or texture effects can be made by mixing colored aggregate or using assorted beads or metal fines. Therefore, optimum aggregate particle size distribution and dipersion can vary.

With the chicken feed method the thermosetting resin is first applied and then the aggregate applied in excess. After the resin has cured the excess can be shaken off and, if desired, another layer of the resin and the aggregate applied. Layers can be in the range of 50 mils to 250 mils dependent on the desired effect.

An alternate approach is to mix the aggregate with the thermosetting resin and apply. This reduces the labor costs but also, can lend to increase the cost of materials due to the use of more thermosetting resin.

Particle size of the aggregate is thus widely variant and can be quite small, typically in the range of a few microns at the smallest up to any size requisite for the particular application.

UNSATURATED THERMOSETTING RESIN COATING

The thermosetting resin preferable for the present disclosure comprises:
1. unsaturated polyester or polyesteramide resins,
2. norbornyl modified unsaturated polyester or polyesteramide resins,
3. hydrocarbon modified unsaturated polyester or polyesteramide resins,
4. vinyl ester resins, or
5. mixtures of the foregoing resins.

These unsaturated resins are blended with about 1 to about 99 percent by weight and preferably 30 to 80 percent by weight, of one or more ethylenically unsaturated monomers to make up the thermosettable resin compositions.

The unsaturated polyesters or polyesteramides used in this invention posses $\alpha,\beta$-unsaturated carboxylic acid ester groups within the polymer chains. Said unsaturated polymers are composed of the polymerizate of a polyol, an $\alpha,\beta$-unsaturated polycarboxylic acid and, optionally, a saturated and/or aromatic polycarboxylic acid. Preparation of said unsaturated polyesters is taught by Kirk-Othmer, Encyclopedia of Chemical Technology, Vol. 18, pages 575-594 (1982) which is incorporated herein by reference. The unsaturated polyesteramides used in this invention possess amide groups within the polymer chains which are obtained by partial replacement of the polyol by a polyamine or mixture of polyamines.

The norbornyl modified unsaturated polyesters or polyesteramides used in this invention have an ester or esteramide chain, respectively, and have at least one terminal norbornyl radical. The ester chain is composed of the polymerizate of a polyol, an $\alpha,\beta$-unsaturated polycarboxylic acid and, optionally, a saturated and/or aromatic polycarboxylic acid. The ester amide chain is composed of the polymerizate of a polyol, a polyamine, an $\alpha,\beta$-unsaturated polycarboxylic acid and, optionally, a saturated and/or aromatic polycarboxylic acid. The norbornyl radical is derived from dicylopentadiene, dicyclopentadiene monoalcohol, polycyclopentadiene, dicyclopentadiene concentrate, mixtures thereof and the like. Preparation of said norbornyl modified unsaturated polyesters and polyestermides is taught by U.S. Pat. No. 4,029,848; 4,117,030; 4,167,542; 4,233,432; 4,246,367; 4,313,499; 4,360,634; 4,409,371; and 4,410,686. Resin concrete compositions prepared using a dicyclopentadiene modified unsaturated polyester resin are taught by U.S. Pat. No. 4,228,251. Polymer concrete compositions prepared using a norbornyl modified unsaturated polyesteramide resin are taught by Ser. Number 643,571 filed Aug. 23, 1984.

Hydrocarbon modified unsaiurated polyesters or polyesteramides prepared from resin oils used in this invention as well as polymer concrete compositions thereof are taught by Ser. No. 661,845 filed Oct. 17, 1984. Blends of norbornyl modified unsaturated polyesters and/or polyesteramides with vinyl ester resins used in this invention are taught by Ser. No. 411,178 filed Aug. 25, 1982. All of the above patents and applications are incorporated herein by reference.

Vinyl esters resins (VER) are the reaction product of about equivalent amounts of a monounsaturated monocarboxylic acid and a polyepoxide. One class of VER is described in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of VER from monocarboxylic acids such as acrylic and metacrylic acid. Bowen also describes alternate methods of preparation wherein a glycidyl methacrylate or acrylate is reacted with the sodium salt of a dihydric phenol such as bisphenol A. VER based on epoxy novolac resins are described in U.S. Pat. No. 3,3091,743 to Fekete et al. Fekete et al. described VER where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, such as an amine, mercaptan and the like, may be utilized in place of the dicarboxylic acid. All of the above-described resins, which contain the characteristics linkages

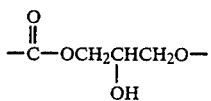

and terminal polymerizable vinylidene groups are classified as VER and are incorporated by reference.

Briefly, any of the known polyepoxides may be employed in the preparation of the vinyl ester resins of this invention. Useful polyepoxides are glycidyl polyethers of both polyhydric alcohols and polyhydric phenols, such as the diglycidyl ether of bisphenol A; epoxy novolacs; epoxidized fatty acids or drying oil acids; epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alchols or polyhydric phenols having weights per epoxide group of about 150 to 2000. The polyepoxides may be nuclearly substituted with halogen, preferably bromine. These polyepoxides are usually made by reacting at least about two moles of any epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per mole, i.e., a 1-2-epoxy equivalency greater than one.

Polymerisible ethylenically unsaturated monomers suitable for blending with the thermosettable resin compositions include both the alkenyl aromatic monomers such as styrene, vinyl toluene, t-butylstyrene, chlorostyrene, methylstyrene, divinylbenzene, mixtures thereof and the like and the alkyl and hydroxyalkyl ester of acrylic acid and methacrylic acid such as methyl methacrylate, ethylacrylate, propylacrylate, secbutylacrylate, n-butylacrylate, cyclohexylacrylate, dicyclopentadienyl acrylate, hydroxyethyl acrylate, hydroxypropylmethacrylate, timethylopropane triacrylate, trimethylol-propane trimethacrylate, pentaerythrithol trimethacrylate, mixtures thereof and the like. Most any vinyl monomer may be employed which is copolymerizable with the unsaturated groups of the thermosettable resin composition.

An ethylenically unsaturated monomer or mixture of said monomers as described above may also be used alone in quantities of 35–75% with the basic alkyd to prepare the compositions of the thermoset resin of the present invention.

The unsaturated thermosettable resin and/or ethylenically unsaturated monomer mixtures are curable by known catalyst systems. Peroxides, such as methyl ethyl ketone peroxides, can be used with or without known promoters, such as cobalt octoate or cobalt napthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 4.0 weight percent depending on the rate of cure desired, the magnitude of the generated exotherm and for other known purposes. Suitable gelation retarding agents, such as p-benzoquinone, can be employed in the curing system. Also, waxes dissolved in monomers can be added to stop air inhibition.

In one embodiment of the invention the resin is prepared to form a polymer concrete by blending a curable component (unsaturated thermosettable resins and/or ethylenically unsaturated monomer blend) and the appropriate aggregate. The catalyst and accelerator (if necessary) are added before the resin and aggregate are mixed. In the preferred range, the blend ranges from about 2% to about 20% by weight of a thermosettable resin and/or ethylenically unsaturated monomer composition from about 75% to 97.9% by weight of an aggregate. While the components may be blended in any order, it is preferable to pre-blend the aggregate component prior to addition of the unsaturated thermosettable resin and/or unsaturated monomer composition. While this blend can be made to totally supply the entire measure of aggregate required, it is possible to apply aggregate individually to the tacky surface prior to curing and thereafter brush off the excess aggregate. In other words, the aggregate can be provided totally with the resin, totally by sprinkled application at the tacky state, or can be applied in combination with part of the aggregate in the resin and any remaining part of the aggregate supplied by sprinkling onto the monolithic overlay of resin.

The viscosity of the resin comes into play in the event the aggregate is too fine or the resin viscosity is inappropriate. For instance, where the resin has a viscosity less than about 300 cps at 77° F., the resin is mixed with a fine aggregate such as silica flour or fly ash to prepare an acceptable bed for subsequently added larger aggregate particles. This enables the application of two types of aggregate. Furthermore the two types of aggregates in the finished product still yield a proper mixture within the cured composite member capable of providing the requisite physical characteristics. Another important feature in the addition of the aggregate in both fashions is the ability to add aggregate which yields different coloration including decorative aggregate on the surface as well as aggregate at all depths in the cured resin.

Generally, the resin is applied in a catalyzed thermosetting composition containing an ethylenically unsaturated monomer catalyzed typically by an organic peroxide initiator having a promoter an accelerator for a fast cure. The resin may be applied with any measure of aggregate required to aid in bonding of subsequently applied coarse aggregate. Typically, the aggregate:resin ratio is in the range of about 3:1 to about 4:1 of aggregate to resin. Typically, the aggregate and resin mixture is applied by trowel, roller applicators, spraying and the like. At this stage of handling, it is sufficiently viscous to enable handling by the appropriate applicator mechanism. Moreover, it is applied in a layer to a depth to cure as described over the latex and polystyrene base. Once the aggregate and resin have been applied, subsequent surface sprinkling of addition aggregate is optionally permitted. Last of all, it is appropriate to apply a spray coating of the thermosetting resin to finish sealing this surface and to cover over all of the particles of aggregate. Thus, there is a first layer which may be the last or multiple layers can be applied. Each layer can include an aggregate therein. It is normally desirable to apply a last layer of resin without aggregate to assure surface smoothness to a specified measure. As noted, the resin can be mixed with a color agent to provide opaque coloration to the finish product.

Representative physical dimensions of the composite article made by the present disclosure contemplates a latex layer of up to about 1 or 2 mils thickness. The resin (having aggregate therein) can range anywhere from about 2 mils up to about 100 mils thickness. The aggregate can be as small as about 10 or 20 microns. The aggregate can be as large as is practically required for decorative or wear purposes. The resin is preferably applied in one or more coatings or layers which adhere to one another and form a single or monolithic layer without interface. The last layer of resin applied can be sprayed or painted on without aggregate to thereby smooth the surface. Various surface finishing techniques can be used to make the surface as smooth as reasonably required. The mechanical characteristics of the finished product can be enhanced by adding a color pigment to the last layer of resin or all of the resin so that the color is deep and extends through the resin coating.

While the foregoing is directed to the preferred embodiment, the scope is determined by the claims which follow.

I claim:

1. A process of altering the surface of a foamed vinyl aromatic polymer surface comprising the steps of:
   (a) over a surface of a foamed vinyl aromatic polymer, placing thereon a latex coating chosen from a butadiene copolymer system wherein the comonomer is styrene or vinylidene chloride;
   (b) over the latex coating, adding a fine particulate solid or aggregate;
   (c) contacting the particulate solid or aggregate with a thermosetting resin mixture of ethylenically unsaturated monomers and one or more of:
      (1) unsaturated polyester or polyesteramide resins,
      (2) norbornyl modified unsaturated polyester or polesteramide resins,
      (3) hydrocarbon modified unsaturated polyester or polyesteramide resins,
      (4) vinyl ester resins, or
      (5) mixtures of the foregoing resins;
   (d) curing the thermosetting resin mixture over the entire surface to be protected to form an altered protective surface there across.

2. The method of claim 1 wherein the resin is applied over the latex with the particulate solid or aggregate applied in excess and removing any excess; and additional resin is applied to seal the protected surface.

3. The method of claim 2 wherein step (c) is repeated one or more additional times, forming a protective layer composite.

4. The composition made by the process of claim 1.

5. A plastic product having a protective external surface comprising:
   (a) a bottom layer having a surface to be protected, the bottom layer being a foamed vinyl aromatic polymer;
   (b) a latex aggregate layer over the bottom layer, the latex aggregate layer being a copolymer system of butadiene and styrene or vinylidene chloride or styrene-vinylidene chloride;
   (c) a top layer over the latex and aggregate layer made of
      (1) a fine particulate solid or aggregate with
      (2) a thermosetting resin mixture of ethylenically unsaturate monomers, and or more of:
         (a) unsaturated polyester or polyesteramide resins,
         (b) norborynyl modified unsaturated polyester or polyesteramide resins,
         (c) hydrocarbon modified unsaturated polyester or polyesteramide resins,
         (d) vinyl ester resins, or
         (e) mixtures of the foregoing resins.

6. The product of claim 5 wherein the cured top layer is between about 2 and about 250 mils thick.

7. The product of claim 5 wherein the cured to layer is between about 1:3 to about 1:4 ratio of resin to particulate solid or aggregate.

8. The product of claim 5 wherein:
   (a) the bottom layer is a closed cell foam of any thickness;
   (b) the latex layer has a thickness that expands to cover the bottom layer to a depth of up to about 20 mils;
   (c) top layer incorporates said particulate solid or aggregate homogeneously distributed throughout and over the expanse of the bottom layer and has a thickness of 50 to about 250 mils.

9. The product of claim 5 wherein said cured top layer is between 10 and 20% of said resin mixture and said particulate solid or aggregate has particles up to about ¼" diameter.

10. The product of claim 5 wherein:
    (a) said bottom layer is 10–20 mils thick;
    (b) wherein said latex layer is a copolymer system of butadiene and styrene or butadiene-styrene-vinylidene chloride, or butadiene-vinylidene-cloride; and
    (c) said cured top layer includes an aggregate as said particulate and unsaturated polyester resin as said thermosetting resin mixture.

* * * * *

UNITED STATES PATENT AND TRADEMARK OFFICE
CERTIFICATE OF CORRECTION

PATENT NO. : 4,729,919
DATED : March 8, 1988
INVENTOR(S) : James C. Uroda

It is certified that error appears in the above-identified patent and that said Letters Patent is hereby corrected as shown below:

Col. 1, lines 8, 12, 18, 24-25, 26, 28-29 and 37; change "styrofoam" to -- expanded cellular polystyrene --

Col. 1, line 46; change "provided a cosmetically" to -- provide cosmetically --

Col. 2, lines 9 and 62; change "styrofoam" to -- Styrofoam --

Col. 2, line 55; delete "(styrofoam)"

Col. 2, line 62; delete "foamed"

Col. 3, line 16; change "Sytrofoam surface" to --surface of the Styrofoam --

Col. 4, line 39; change "unsaiurated" to -- unsaturated --

Col. 4, line 61; change "3,3091,743" to -- 3,301,743 --

Col. 5, line 22; change "alchols" to --alcohols --

Col. 5, line 33; change "polymerisible" to -- polymerizable --

Col. 5, line 43; change "timethylopropane" to --trimethylolpropane --

Col. 8, line 29; change "cured to layer" to -- cured layer --

Col. 8, line 50; change "chloride" to -- chloride -- second occurance

Signed and Sealed this

Twenty-fourth Day of January, 1989

Attest:

DONALD J. QUIGG

*Attesting Officer*   *Commissioner of Patents and Trademarks*